United States Patent Office 3,352,819
Patented Nov. 14, 1967

3,352,819
POLYETHYLENE COMPOSITIONS
Richard L. Alexander and Francis E. Brown, Orange, Tex., assignors, by mesne assignments, to Gulf Oil Corporation, Pittsburgh, Pa., a corporation of Pennsylvania
No Drawing. Filed Nov. 29, 1963, Ser. No. 327,084
5 Claims. (Cl. 260—45.9)

This invention relates to substantially color-free compositions of polyethylene containing stabilizers which normally discolor polyethylene.

It is known that polyethylene and other organic materials which are subject to oxidative degradation can be stabilized against such degradation by incorporating therein phenolic antioxidants. See, e.g.: U.S. Patents 2,801,225, 2,820,775, 2,994,086, 3,041,183, 3,043,775, 3,085,003, and 3,103,501. However, the utility of many of these antioxidants is severely limited where the color of the stabilized product is important, as they will often impart an undesirable yellow color to otherwise colorless compositions.

We have now discovered compositions comprising polyethylene, an antioxidant which normally causes yellow discoloration of polyethylene and the monosodium salt of 4-{[4-(N - ethyl - p - sulfobenzylamino) - phenyl]-[4-(n-ethyl-p-sulfoniumbenzylamino) - phenyl]-methylene}-(N, N dimethyl-$\Delta^{2,5}$-cyclohexadienimine) which are substantially colorless.

The last-mentioned additive compound is employed in the compositions of our invention in only an amount sufficient to render the compositions colorless as the use of excessive quantities will itself cause discoloration of the compositions. Generally, the amount of such compound used will be a minor amount, e.g. from about 0.1 to 1, preferably about 0.3, percent by weight of the antioxidant present in such compositions. The compound may be incorporated into the compositions in conventional manner, for example, by adding it directly to the stabilized resin with thorough mechanical mixing, by adding it to the antioxidant and then mixing the resultant composition to the resin or by adding the compound and the antioxidant separately but simultaneously to the resin.

We have found that the compound and the antioxidant may advantageously be added directly to the reactor during the preparation of the polyethylene resin to produce a resin which as it is manufactured will inherently contain these ingredients. Preferably, the compound is added to the antioxidant and this mixture is injected into the ethylene feed to the reactor or the mixture can be injected directly into the reactor if suitable dispersion in the polymerization mixture can be obtained in this manner.

In another preferred embodiment of our invention, we prepare a binary composition of polyethylene and the above-mentioned additive compound. This composition is substantially resistant to yellow discoloration caused by such antioxidants if they are added later in the usual amounts. In these compositions the additive compound is employed in amounts of from about 0.1 to about 1.0 percent by weight of the antioxidant which it is anticipated will be added later.

Example 1

Ethylene was continuously polymerized in a stirred autoclave-type reactor maintained at a pressure of 15,800 p.s.i.g. A methanol solution of 4,4'-methylenebis-(2,6-ditertiarybutyl-phenol) was continuously injected at a rate equivalent to 1000 parts of the phenolic antioxidant per million parts of polyethylene produced (weight basis). The stabilized polyethylene so prepared was distinctly yellow. However, when the above-mentioned, column 1, lines 23 to 25, additive compound is added to the methanol solution of the antioxidant in an amount of 0.3% by weight of the antioxidant prior to injecting the antioxidant solution into the reactor the product so produced is substantially colorless, especially in film-form.

Example 2

Polyethylene was compounded with 4,4'-methylenebis-(2,6-ditertiarybutyl phenol) in a Banbury mixer to produce a composition which contained 1000 p.p.m. (wt. basis) of the antioxidant. The composition was distinctly yellow. However, when the above-mentioned, column 1, lines 23 to 25, additive compound (in methanol solution) is added to the composition in an amount of about 0.3% by weight of the antioxidant the product is substantially colorless.

Having described our invention, we claim:

1. A composition comprising polyethylene, a minor but stabilizing amount of 4,4'-methylenebis-(2,6-ditertiarybutyl phenol) which normally causes yellow discoloration of polyethylene and a stabilizing amount of the monosodium salt of 4-{[4-(N-ethyl-p-sulfobenzylamino)-phenyl]-[4 - (N - ethyl - p - sulfoniumbenzylamino) - phenyl]-methylene}-(N,N dimethyl-$\Delta^{2,5}$-cyclohexadienimine).

2. The composition of claim 1 wherein the said monosodium salt is present in the amount of 0.1 to 1 percent by weight of said 4,4'-methylenebis-(2,6-ditertiarybutyl phenol).

3. The method of preventing yellow discoloration of polyethylene caused by the inclusion in said polyethylene of a minor but stabilizing amount of 4,4'-methylenebis-(2,6-ditertiarybutyl phenol) which comprises incorporating in said polyethylene the monosodium salt of 4-{[4-(N-ethyl - p - sulfoniumbenzylamine)-phenyl]-[4-(N-ethyl-p-sulfoniumbenzylamino) - phenyl] - methylene}-(N,N dimethyl-$\Delta^{2,5}$-cyclohexadienimine) in an amount at least effective to prevent such discoloration but in less than an amount which will cause additional discoloration of the polyethylene.

4. The method of claim 3 wherein the said monosodium salt is present in the amount of 0.1 to 1 percent by weight of said 4,4'-methylenebis-(2,6-ditertiarybutyl phenol).

5. In a continuous process for preparing polyethylene in which ethylene is polymerized at an elevated temperature and pressure in a stirred autoclave and 4,4'-methylenebis - (2,6 - ditertiarybutyl phenol) is continuously charged to the autoclave at a rate equivalent on a weight basis to about 1,000 parts per million of polyethylene produced; the improvement which comprises reducing the yellow color normally obtained in such polyethylene by concurrently adding to the autoclave the monosodium salt of 4-{[4-(N - ethyl-p-sulfobenzylamino)-phenyl]-[4-(N-ethyl-p-sulfoniumbenzylamino) - phenyl]-methylene}-(N, N dimethyl-$\Delta^{2,5}$-cyclohexadienimine) in an amount of about 0.3 percent by weight of said 4,4'-methylenebis-(2,6-ditertiarybutyl phenol).

No references cited.

DONALD E. CZAJA, Primary Examiner.
LEON J. BERCOVITZ, Examiner.
H. E. TAYLOR, Jr., Assistant Examiner.